United States Patent [19]
Matsubayashi et al.

[11] Patent Number: 5,991,440
[45] Date of Patent: Nov. 23, 1999

[54] METHOD AND APPARATUS FOR RECOGNIZING INPUT HANDWRITTEN CHARACTERS ASSOCIATED WITH TITLE INFORMATION

[75] Inventors: Kazuhiro Matsubayashi, Yokohama; Shinnosuke Taniishi, Kawasaki; Eisaku Tatsumi, Yokohama; Shigeki Mori, Koshigaya; Atsushi Tanaka, Yokohama, all of Japan

[73] Assignee: Canon Kabushiki Kaisha, Tokyo, Japan

[21] Appl. No.: 08/402,151

[22] Filed: Mar. 10, 1995

Related U.S. Application Data

[63] Continuation of application No. 07/899,710, Jun. 16, 1992, abandoned.

[30] Foreign Application Priority Data

Jun. 21, 1991 [JP] Japan .................................. 3-150045

[51] Int. Cl.⁶ .................................................. G06K 9/00
[52] U.S. Cl. .......................................... 382/187; 382/189
[58] Field of Search .................................. 382/187, 189, 382/317, 197; 364/525

[56] References Cited

U.S. PATENT DOCUMENTS

| | | | |
|---|---|---|---|
| 3,643,069 | 2/1972 | Kikuchi | 235/61.11 |
| 4,628,532 | 12/1986 | Stone et al. | 382/197 |
| 4,672,677 | 6/1987 | Yamakawa | 382/187 |
| 4,766,404 | 8/1988 | Ishida et al. | 364/525 |
| 4,813,077 | 3/1989 | Woods et al. | 382/61 |
| 4,866,646 | 9/1989 | Nakamura et al. | 364/709.11 |
| 4,972,496 | 11/1990 | Sklarew | 382/187 |
| 5,063,600 | 11/1991 | Norwood | 382/187 |
| 5,119,437 | 6/1992 | Kuwamura et al. | 382/61 |
| 5,134,669 | 7/1992 | Keogh et al. | 382/61 |
| 5,140,650 | 8/1992 | Casey et al. | 382/61 |
| 5,228,100 | 7/1993 | Takeda et al. | 382/61 |

FOREIGN PATENT DOCUMENTS

| | | | |
|---|---|---|---|
| 0114249 | 11/1983 | European Pat. Off. | G06K 9/20 |
| 0230994 | 1/1987 | European Pat. Off. | G06F 15/20 |
| 3325811 | 1/1985 | Germany | G06F 3/03 |
| 59-75376 | 4/1984 | Japan | G06K 9/62 |
| 61-281383 | 12/1986 | Japan | G06K 9/62 |
| 64-55681 | 3/1989 | Japan | G06K 9/62 |
| 3-81817 | 4/1991 | Japan | G06F 3/03 |

*Primary Examiner*—Jose L. Couso
*Assistant Examiner*—Anh Hong Do
*Attorney, Agent, or Firm*—Fitzpatrick, Cella, Harper & Scinto

[57] ABSTRACT

The present invention relates to a character input apparatus and method which pairs the title of a heading to the region where a character is inputted and determines the character group which can be inputted into the region corresponding to the heading as input candidate characters. When a character is inputted in the region, the heading in that region is discriminated and the characters are recognized referring to the input candidate character group corresponding to the title of the heading.

18 Claims, 7 Drawing Sheets

| 31 | 32 | 33 | 34 | 35 | 36 | 37 |
|---|---|---|---|---|---|---|
| TABLE | DATA | TITLE | RULED LINE | DELETE | RETRIEVE | SAVE |

NAME Ishii  Kazuo

TELEPHONE (044) 549 - 5111

ZIP 211    BLOOD TYPE AB

ADDRESS Kawasaki-shi, Saiwai-ku, Kashimada 890-12

F I G.  3

| 31 | 32 | 33 | 34 | 35 | 36 | 37 |
|---|---|---|---|---|---|---|
| TABLE | DATA | TITLE | RULED LINE | DELETE | RETRIEVE | SAVE |

NAME Ishii  Kazuo

ADDRESS Kawasaki-shi, Saiwai-ku, Kashimada 890-12

POSITION Section Chief    ZIP 211

TELEPHONE (044) 549 - 5111

| HEADING TITLE | CANDIDATE CHARACTERS |
|---|---|
| NAME | ALPHABETS, KANA, KANJI |
| TELEPHONE | NUMERALS ( 0 ~ 9 ), -, ( , ) |
| ZIP | NUMERALS ( 0 ~ 9 ), - |
| BLOOD TYPE | A, B, O |
| ADDRESS | ALPHABETS, NUMERALS ( 0 ~ 9 ), -, KANA, KANJI |

METHOD AND APPARATUS FOR RECOGNIZING INPUT HANDWRITTEN CHARACTERS ASSOCIATED WITH TITLE INFORMATION

This application is a continuation of application Ser. No. 07/899,710 filed Jun. 16. 1992, now abandoned.

BACKGROUND OF THE INVENTION

1. Field of the Invention

The present invention relates to a character input method and apparatus which inputs characters and obtains the character codes corresponding to the inputted characters.

2. Description of the Related Prior Arts

There is a conventional freehand character input apparatus which recognizes an inputted freehand character and displays the character on a coordinate input apparatus such as a tablet. In such an apparatus, in the case where an inputted freehand character is recognized, a list of recognition candidate characters corresponding to each heading to which a freehand character is inputted is designated in advance and a character recognition is performed on the basis of the list of recognition candidate characters. The inputted freehand character is recognized in a manner such that a plurality of candidate characters among the recognized candidate characters are displayed and the appropriate character among the displayed candidate characters is selected and designated. Furthermore, the following apparatus is also known. That is, to which region of the screen the position where the freehand character has been inputted belongs is discriminated, and the kind of the candidate characters corresponding to that region is specified. Then, the plurality of specified candidate characters are displayed and the character is recognized.

However, in the above-described method and apparatus, there are the following drawbacks. First, in the former case, since the list of recognition candidate characters is effective only when data is inputted into a certain heading, the list of candidate characters needs to be changed whenever the title of a heading is changed resulting in complexity of the operation.

Second, in the later case, since the region determination is performed on the basis of the position of the screen where the inputted freehand character is located, if the layout of document is changed, the designation of candidate characters needs to be changed. Therefore, whenever the document layout is changed, the recognition candidate characters corresponding to the region of the screen needs to be redesignated. Thus, the operation is considerably complicated.

SUMMARY OF THE INVENTION

Accordingly, it is an object of the present invention to provide a character input method and apparatus capable of recognizing the character corresponding to the title of a heading to which a character has been inputted.

It is another object of the present invention to provide a character input method and apparatus capable of setting the candidate characters, which can be inputted, corresponding to a heading.

It is another object of the present invention to provide a character input method and apparatus which improves the possibility for accurate character recognition by setting the recognition candidate characters according to the title of a heading.

It is another object of the present invention to provide a character input method and apparatus capable of performing character recognition based on the recognition candidate corresponding to the position even if a position where a character is inputted is changed.

According to the present invention, the foregoing objects are attained by providing a character input method and apparatus which recognizes an inputted character and obtains a character code corresponding to the inputted character, comprising: discrimination means for discriminating the heading information corresponding to the position where a character was inputted; and recognition means for recognizing the inputted character referring to a stored candidate character group for character recognition corresponding to the heading information.

According to the present invention, the foregoing objects are attained by providing a character input method which recognizes an inputted character and obtains the character code corresponding to the inputted character, comprising the steps of: setting a region to specify an input region of a character input screen; providing the specified information corresponding to each set region; setting the recognition candidates of the character which is to be inputted to the region corresponding to the specified information; discriminating the input region where the character was inputted and determining the recognition candidates in the region according to the specified information of the region; and recognizing the inputted freehand character referring to the recognition candidates.

Other features and advantages of the present invention will become apparent from the following description taken in conjunction with the accompanying drawings, in which like reference numbers designate the same or similar parts throughout the figures thereof.

DESCRIPTION OF THE PREFERRED EMBODIMENTS

Preferred embodiments of the present invention will now be described in detail in accordance with the accompanying drawings.

Figure 1:
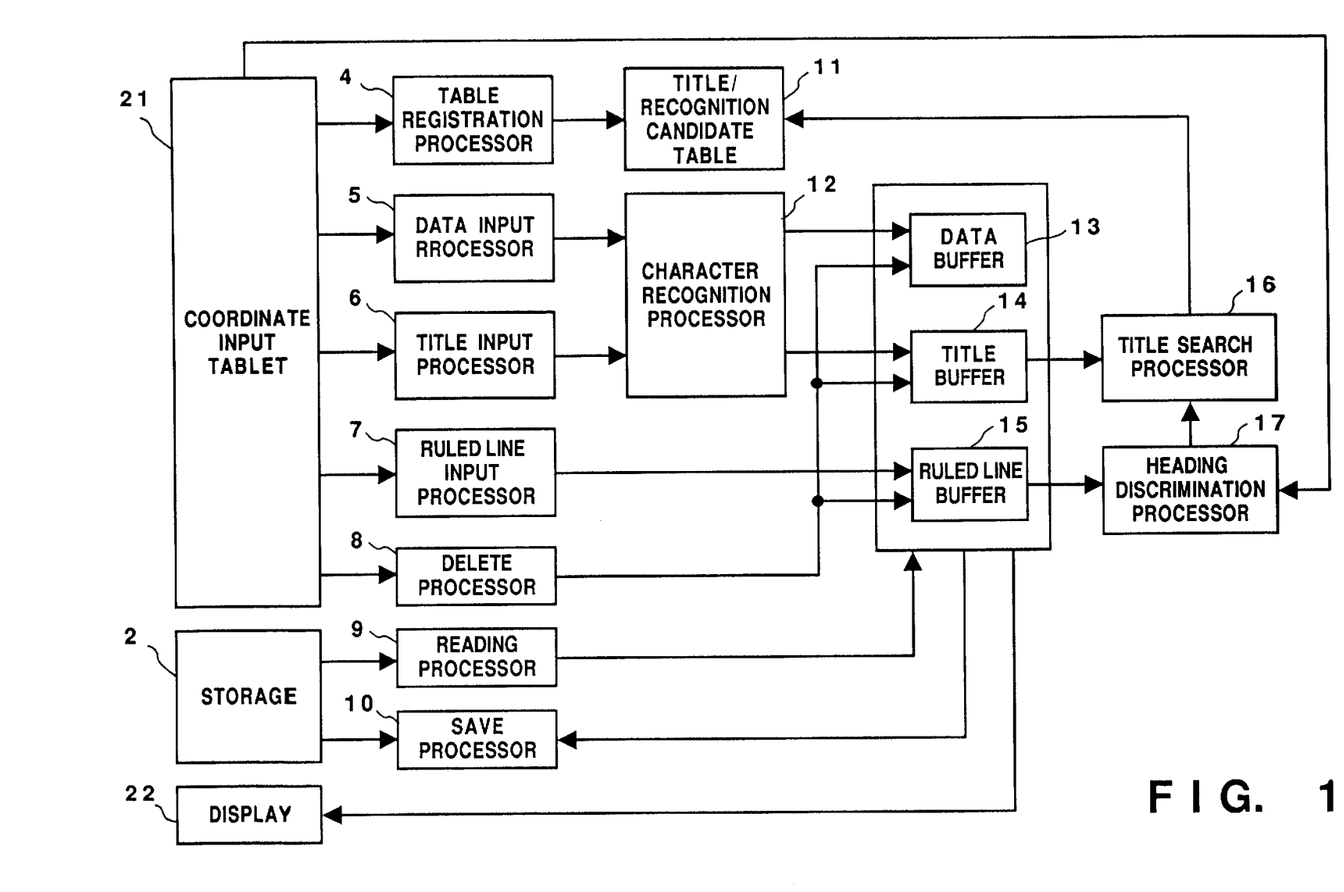
FIG. 1 is a block diagram illustrating the functional construction of the freehand character input apparatus according to the present embodiment.
Figure 2:
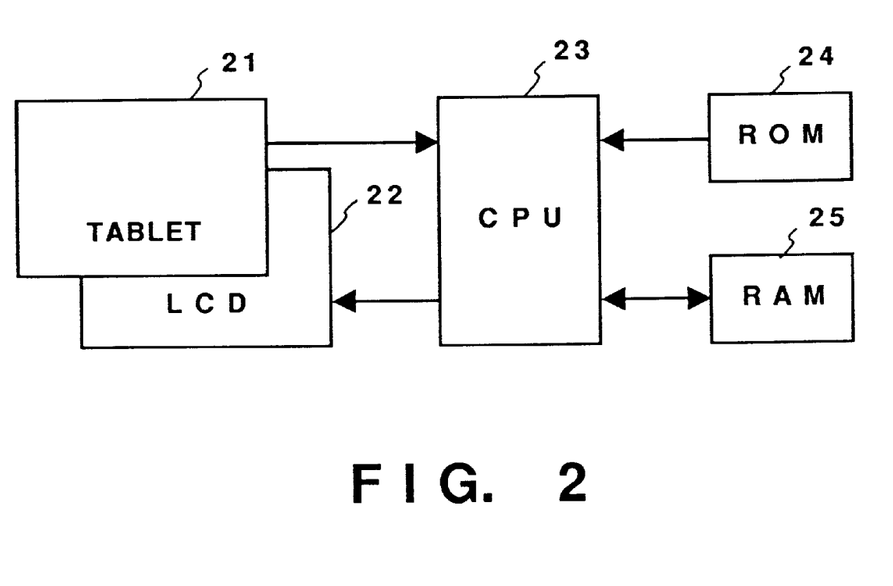
FIG. 2 is a block diagram illustrating the general block diagram of the freehand character input apparatus according to the present embodiment.

FIG. 1 is a block diagram illustrating the functional construction of the freehand character input apparatus according to the present embodiment. FIG. 2 is a block diagram illustrating the schematic hardware construction of the freehand character input apparatus according to the present embodiment.

In FIG. 2, the numeral 21 is a tablet for a coordinate input on which the operational face is formed by transparent resin. When a character is written on the tablet 21 by an input pen or the like, the freehand character is inputted. The numeral 22 is a display such as LCD which is placed under the tablet 21. The display 22 displays the outline of a freehand character which was inputted to the tablet 21 and developed to a character image (bit map) according to the font data of the ROM 24. The numeral 23 is a CPU for controlling the whole apparatus comprising a microprocessor and the like. The numeral 24 is a ROM which stores the control program of the CPU 23 and various kinds of character patterns (character font data) corresponding the character codes. The numeral 25 is a RAM which is utilized as a work region of the CPU 23 and stores various kinds of data including a string of character codes of the recognized characters and the buffers and flags (to be described later).

In FIG. 1, the numeral 21 is a coordinate input section comprising the tablet shown in FIG. 2 and an input pen and the numeral 22 is a display such as an LCD. The numerals 4–10, 16, and 17 refer to various kinds of processing section which are described later. The numeral 12 is the character recognition processor which recognizes a freehand character inputted from the coordinate input section 21. The character recognition processor 12 includes the processing that recognizes the character inputted as document data, which has been inputted from the data input processor 5, and the processing that recognizes the title characters of a heading which are inputted from the title input processor 6. The numerals 13–15 refer to various kinds of buffers. The numeral 13 is the data buffer which stores the character code which was recognized in the character recognition processor 12, the numeral 14 is the title buffer, and the numeral 15 is the ruled line buffer which stores the ruled line data inputted from the ruled line input processor 7.

Figure 3:
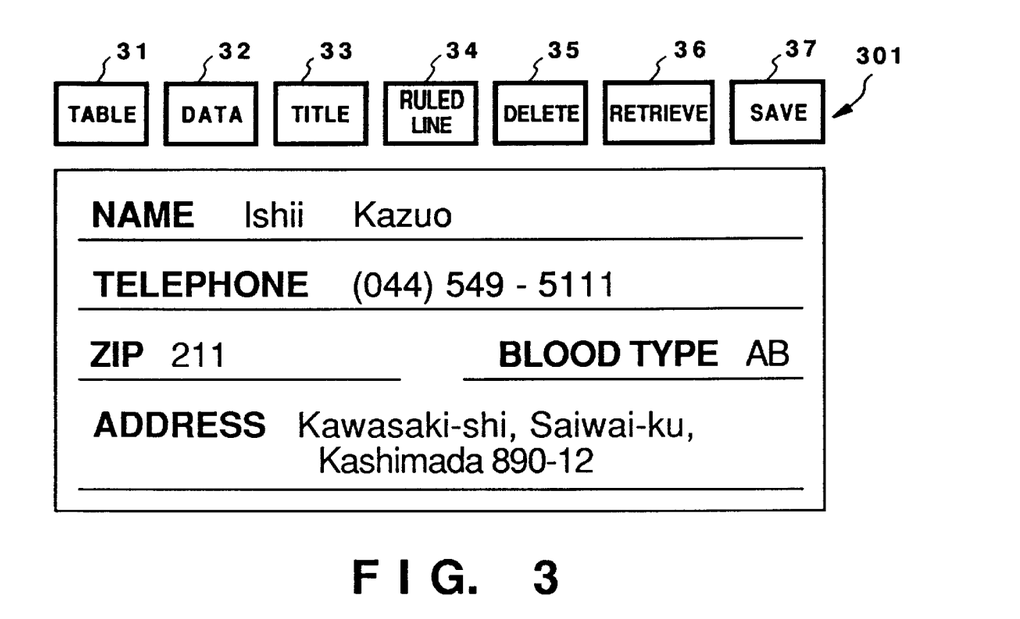
FIG. 3 is a diagram illustrating an example of the screen display which displays personal information in the freehand character input apparatus according to the present embodiment.

The processing of the freehand character input apparatus comprising the above-described construction is now described along with an example where personal information is inputted and displayed as shown in FIG. 3.

As shown in FIG. 3, the personal information for one page comprises the data such as "Ishii Kazuo", "(044) 549-51111", "211", "AB", and "Kawasaki-shi, Saiwai-ku, Kashimada 890-12", the heading title such as "NAME", "TELEPHONE", "ZIP", "BLOOD TYPE", and "ADDRESS", and the ruled line which divides each heading region. As apparent from FIG. 3, each heading comprises a ruled line, a string of characters indicating a heading title, and a string of data characters. Furthermore, each key of the framed region 301 such as "TABLE", "DATA", and "TITLE", which is located at the upper region of a screen, is a switch key of the freehand input mode. These keys are displayed on the LCD 22, and when the region corresponding to the display key is touched on the tablet 21, the corresponding mode is set. The input of character data in the data mode, title mode, or ruled line mode is inputted by freehand input from the coordinate input section 21 as shown in FIG. 1.

The function of each key of the framed region 301 is described.

The numeral 31 is a table registration mode key and a table registration mode is set when the key 31 is depressed.

In the coordinate input section 21 at the registration mode, a heading is selected by a pen or finger and the candidate characters for the heading are registered. The registration processing is later described in detail along with FIGS. 5 and 6. The numeral 32 is a data mode key which drives the data input processor 5 when the data input mode is set by the key 32. The character data which is inputted from the coordinate input section 21 is processed as the data of the heading. The numeral 33 is a title mode key. When the title input mode is set by the key 33, the title input processor 6 is driven and the character data inputted from the coordinate input section 21 is processed as the title of the heading. Furthermore, the numeral 34 is the ruled line mode key. When the ruled line input mode is set by the key 34, the ruled line input processor 7 is driven and the ruled line is formed on the basis of a coordinate value inputted from the coordinate input section 21 and stored in the ruled line buffer 15.

When the data input processor 5 and the title input processor 6 are driven, the character recognition processor 12 is further driven and the character code corresponding to the inputted freehand character is obtained. In this way, the recognized character code and the coordinate value of the ruled line are stored in the data buffer 13, the title buffer 14, or the ruled line buffer 15 according to the mode at that time.

The numeral 35 is the delete mode key. When the key 35 is depressed, the delete mode is set and the inputted data, title, or ruled line is deleted from the corresponding buffer. The numeral 36 is the retrieve mode key. When the retrieve mode is set by the key 36, the personal information of one page is read out of the storage 2 to the corresponding buffer. That is, the data region is stored in the data buffer 13, the title region is stored in the title buffer 14, and the ruled line region is stored in the ruled line buffer 15. The numeral 37 is the save mode key. At the save mode, the data such as title data or ruled line data which is stored in each buffer is stored in the storage 2 as personal information for one page. The personal information in these buffers is displayed on the display 22 at real time.

In the example shown in FIG. 3, the five headings such as "NAME", "TELEPHONE", "ZIP", "BLOOD TYPE", and "ADDRESS" are processed as the personal information of one page. Among those, if the title of a heading is "TELEPHONE", the Arabic numerals "0" to "9", the parentheses "(" and ")", and the hyphen "-" can be used as the data. If the title is "ZIP", only the Arabic numerals and the hyphen can be used and, if the title is "BLOOD TYPE", only the three alphabet characters such as "A", "B", and "O" can be used as the data. Thus, if only the characters which can be used for each heading are set as recognition candidate characters, the possibility that an inputted freehand character is accurately recognized is considerably increased.

Figure 4:
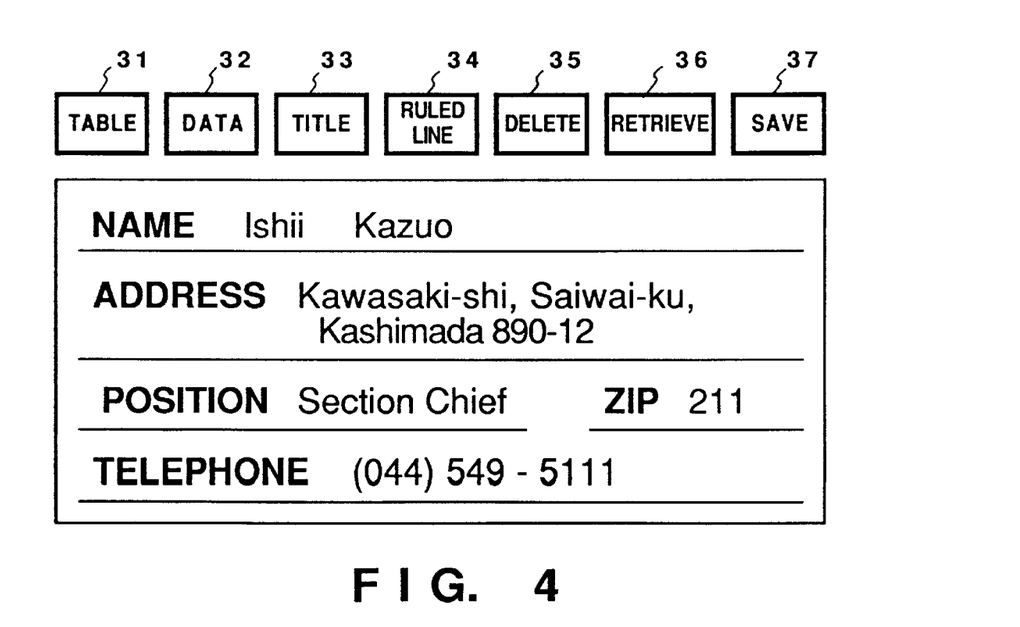
FIG. 4 is a diagram illustrating a case where the layout display shown in FIG. 3 has been changed.

In the present embodiment, the title of each heading is paired to the recognition candidate characters in advance. Therefore, the title of the heading always corresponds to the recognition candidate characters as long as the heading title remains, even if the layout has been changed. For example, if the layout shown in FIG. 3 is changed to the layout shown in FIG. 4 resulting in the display position change, each heading is specified by the content of the title, therefore, each of the recognition candidates does not have to be registered.

The method to register the titles of each heading and a recognition candidate character table is described.

Figure 5:
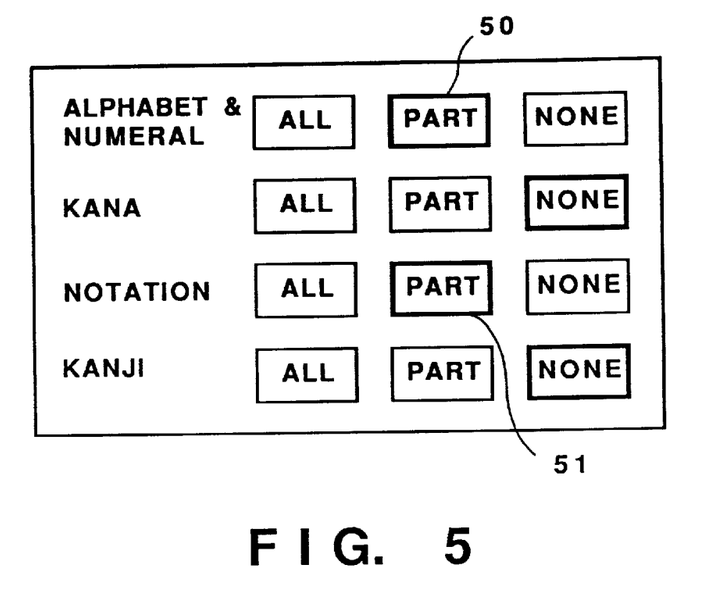
FIG. 5 is a diagram illustrating an example of the screen display in order to select recognition candidates in unit of a list of character in the freehand character input apparatus according to the present embodiment.

First, when the table registration mode key 31 is depressed and the table registration mode is set, the screen shown in FIG. 5 is displayed on the display 22. In this screen, whether or not all data, part of the data, or none of the data is to be registered is determined in every alphabetical characters, numerals, Japanese syllabaries (kana), notation, and Chinese characters (kanji).

The example in FIG. 5 illustrates the case where the recognition candidate characters in the heading "TELEPHONE" or "ZIP" are registered. In these headings, since only the part of the numerals (0–9), the hyphen "-", and parentheses "(" and ")" can be inputted, the kana and Chinese characters are totally excluded.

Figure 6:
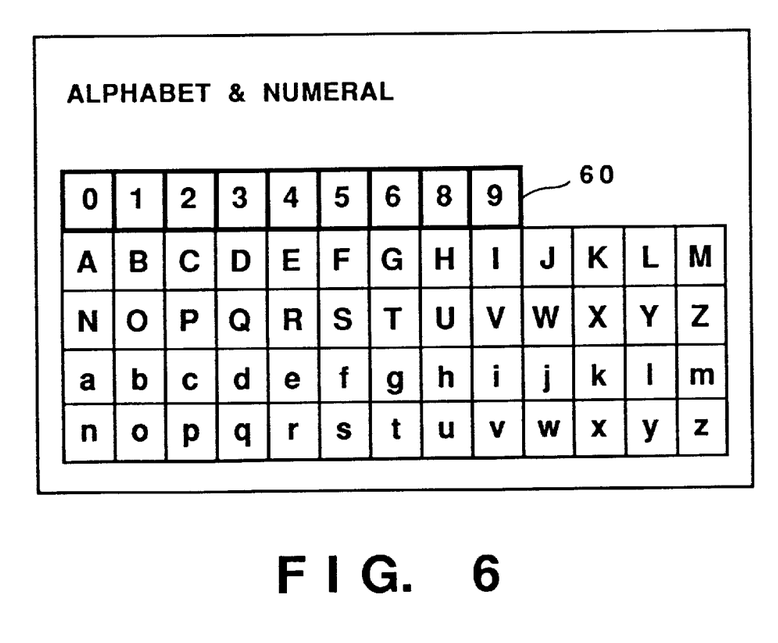
FIG. 6 is a diagram illustrating an example of the display to select part of the alphabet characters and the Arabic numerals according to the present embodiment.

FIG. 6 is a diagram illustrating a screen, in the case where the "PART" is selected, to designate which character in the string of the alphabet characters and numerals should be registered as the recognition candidate. In this case, all string of the Alphabetical characters and numerals is displayed on the display 22 and the characters and numerals to be recognition candidates are registered out of these. In the present embodiment, only the numerals "0" to "9", the reference numeral 60, are registered. Similarly, as shown the reference numeral 51 in FIG. 5, in the case where a few of the notations are registered, all the notations are displayed and only the notations to be recognition candidates are registered.

When the table registration operation is completed in this way, a string of the characters for the designated heading and the heading are paired and registered in the title/recognition table 11.

Figure 7:
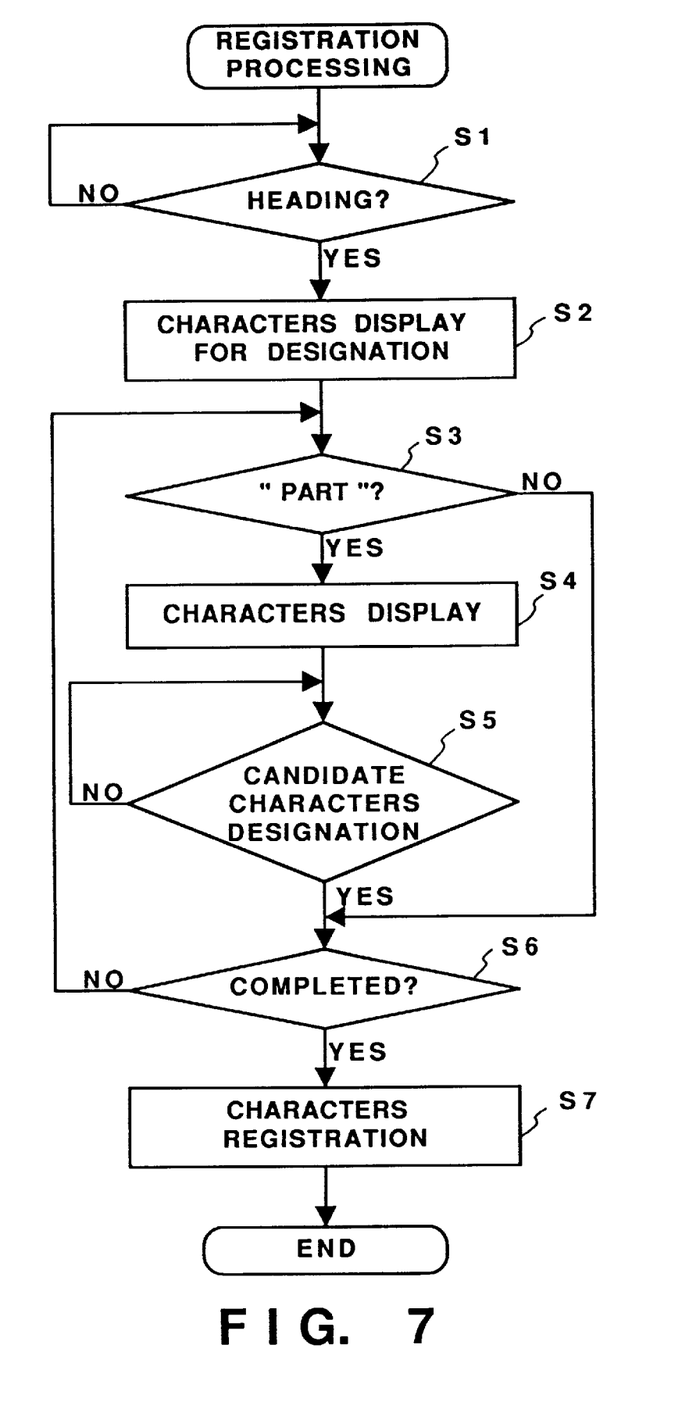
FIG. 7 is a flowchart illustrating the registration processing of the title recognition candidate table according to the present embodiment.
Figure 8:
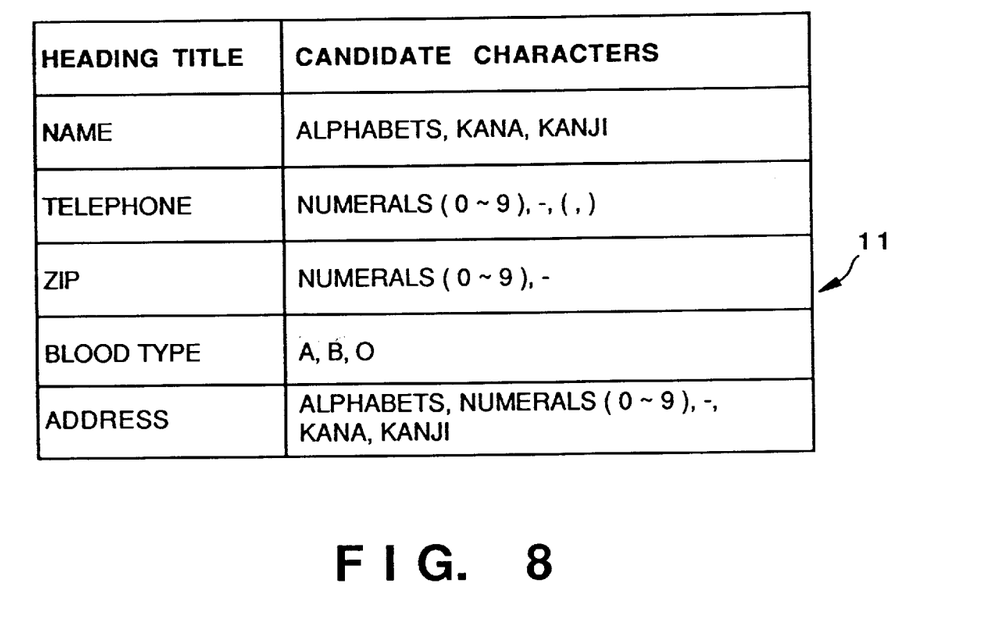
FIG. 8 is a diagram illustrating an example of the data construction of the title recognition candidate table according to the present embodiment.

This registration processing is shown in the flowchart in FIG. 7 and the example of the data of the recognition candidate table 11 which was registered to the heading shown in FIG. 3 is shown in FIG. 8.

The processing in FIG. 7 is started when the table registration mode key 31 is depressed and whether or not a heading is selected on the display 22 is examined in step S1. In the case where the heading is designated, the process proceeds to step S2 where the screen for designating candidate characters are displayed on the display 22. Under this condition, one of "ALL", "PART", and "TNONE" is selected to each heading of "ALPHABET & NUMERAL", "KANA", "NOTATION", and "KANJI" consecutively in a manner such that the region corresponding to the heading is depressed by the pen or the like. Then, in the case where the "PART" is selected in step S3, the step proceeds to step S4 where the designated characters are displayed on the display 22. The process then proceeds to step S5 where the candidate characters are selected out of the group of the displayed characters by depressing the region of the screen corresponding to a desired character. In the case of FIG. 6., the numerals from "0" to "9" are designated. Thus, when the designation of the candidate characters is completed for all headings, the process proceeds from step S6 to step S7 where the candidate characters and the headings are paired and registered in the table 11.

FIG. 8 illustrates the case where the heading and the candidate characters are paired and registered in the table 11.

The method that the ruled line is inputted in the case where the ruled line mode key 34 is depressed and the ruled line mode is set is described. To simplify the description, the ruled line is only to the horizontal direction. When the ruled line input mode is set by the ruled line mode key 34, the line can be drawn on the coordinate input section 21. At the beginning of the line which is the pen down point is set as $(x_0, y_0)$ on the X- and Y-axises, and the end of the line which is the pen up point is set to as $(x_1, y_0)$. The x- and y-axises of the beginning and end points of the ruled line are stored in the buffer 15.

The inputting of personal data and headings is described.

Figure 9:
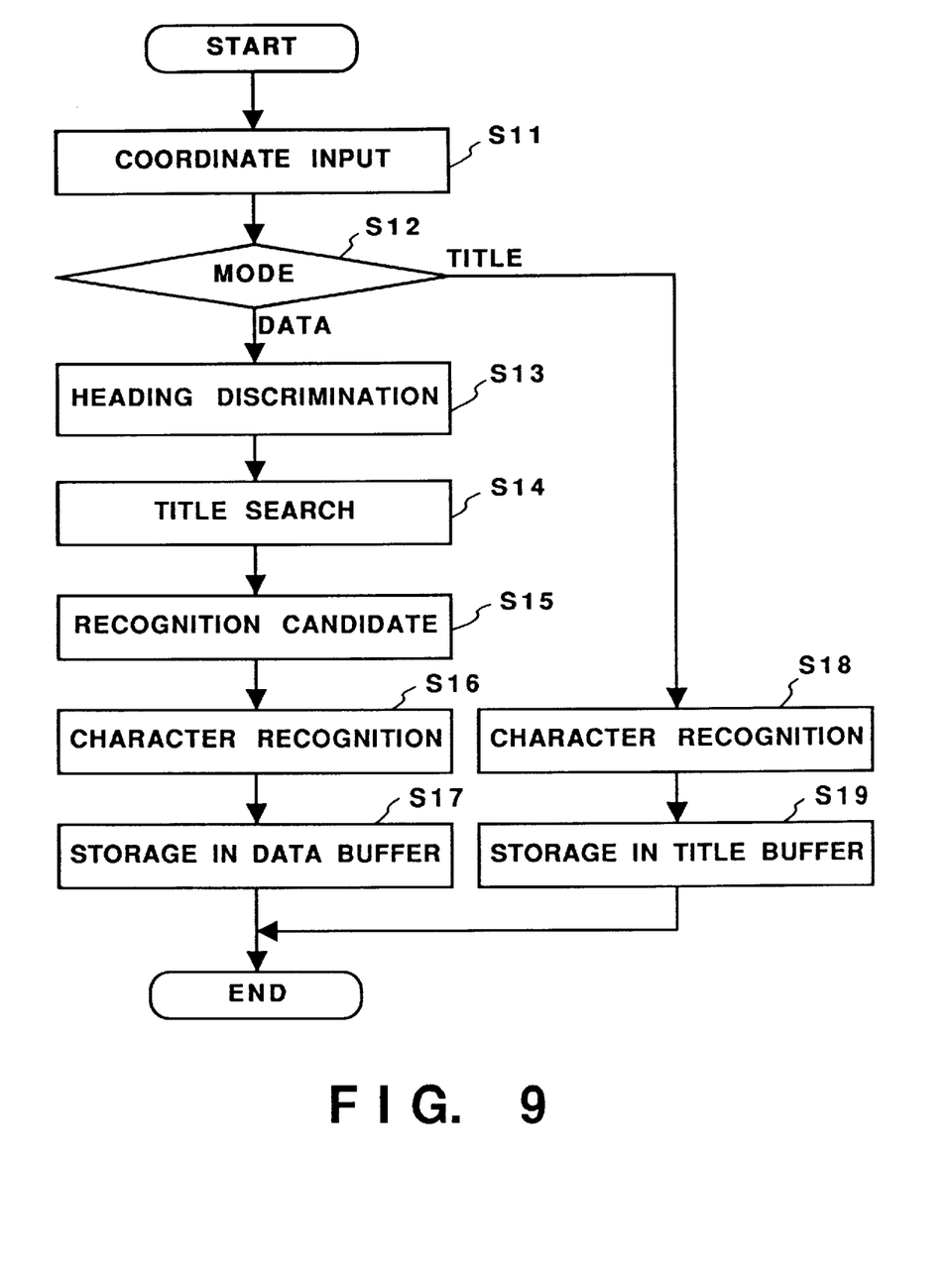
FIG. 9 is a flowchart illustrating the operation of freehand character input for the data or title according to the present embodiment.

FIG. 9 is a flowchart illustrating the processing of the freehand character input on the tablet 21 of the coordinate input section 21.

In step S11, in the case where a freehand character is inputted from the coordinate input section 21 which is incorporated into the display 22, a string of coordinate which has been inputted from the tablet 21 is outputted from the coordinate input section 21. The process then proceeds to step S12 whether or not the current input mode is the data input mode or the heading input mode is examined. In the case of the data input mode, the process proceeds to step S13 where the relation between the inputted coordinates and the ruled line is discriminated by the heading discrimination processor 17 and to which heading the freehand input character belongs is determined. As shown in FIG. 3, since a ruled line corresponds to a heading at one on one, to which heading each inputted freehand character belongs can be determined.

That is, in the processing to determine the heading, the ruled lines are searched from the line in which the value on the y-axis is smallest (which is located at the upper side). In the case where the value on the y-axis of the inputted freehand character is smaller than that of the ruled line (the character is located above the ruled line) and the value of the x-axis of the inputted freehand character is located between the values of the left and right ends of the ruled line (the character is located on the ruled line), the inputted freehand character belongs to the heading corresponding to the ruled line. Thus, the ruled line corresponding to the freehand input character is searched.

Thus, the ruled line corresponding to the freehand input character is determined, the characters for the heading corresponding to the ruled line is searched from the title buffer 14. When the title of the heading is determined, the process proceeds to step S15 where the recognition candidates corresponding to the title are selected from the title/recognition candidate table 11. In this way, the recognition candidate character is determined in the character recognition processor 12 which is described later.

Then, the process proceeds to step S16 where the character recognition is performed on the basis of the string of the coordinate values which is inputted from the coordinate input section 21. The result of the recognition including the candidate characters is displayed on the display 22 and the character recognition process is completed when an operator selects a correct character among the candidate characters. In step S17, the recognized character code and the coordinate value of that character are stored in the data buffer 13.

On the other hand, in step S12, in the case of the title input mode to input the title of the heading, the process proceeds to step S18 where the character recognition is performed by setting all characters as recognition candidates and the result of the recognition is displayed on the display 22. Then, the appropriate character is selected out of these and the character is determined as the result of the recognition. The process, then, proceeds to step S19 where the character code of the recognized title and the coordinate values are stored in the title buffer 14.

In the present embodiment, characters among a group of the characters, which were inputted in the personal data input mode and belong to a certain heading, are arranged according to values of the y-axis. In the case where there are characters in which y-axis values are equal, the character in which x-axis value is smaller than the other comes first. This is the data characters and the characters which are inputted at the title input mode is similarly arranged. As a consequence, the characters are stored from the top to the bottom and the left to the right.

As described above, in the freehand character input apparatus according to the present embodiment, the ruled line which determines the position of the heading and the format including the title of the heading are formed and saved in advance. By registration of those with the title/recognition candidate table 11, in the case where personal data is inputted later, character recognition can be performed on the basis of the recognition candidate characters corresponding to the heading in a manner such that only the format is read and the data is inputted by freehand character. Therefore, it is effective for a patternized operation where a considerable amount of data is inputted at the single format.

Furthermore, whenever freehand characters are inputted one by one, the position of the heading to which the freehand character has been inputted is discriminated, and the title of the heading is searched, and then the recognition candidates corresponding to that heading are determined. Therefore, even if the layout of the display screen is changed, the recognition candidates corresponding to the heading do not have to be registered unless the title of the heading is changed. Therefore, it is effective for an indefinite operation, that is, where an layout of the document is often changed.

In the present embodiment, the ruled line is limited to only to the horizontal direction, however, the ruled line can be in any shape as long as an inputted freehand character corresponds to a certain ruled line and the line further corresponds to the title of a heading. Furthermore, the line can be an imaginative line rather than a visual line as long as headings are divided.

Furthermore, in the above-described embodiment, the title of each heading is represented by characters, however, it can be designated by icons. In this case, it can be set so that icons are numbered and each number is paired with recognition candidates.

Thus, recognition candidates can be set in a manner with a screen divided into regions by ruled lines and a table pairing symbols to specify the information corresponding to each region, and the recognition candidates can be set, and to which region the freehand input character is inputted is discriminated and the recognition candidates are set. Therefore, the layout of the document can be freely changed or set.

In the embodiment above, the example that a character which has been inputted by freehand is recognized has been described. However, the present invention is not restricted to this embodiment. It can be applied to the case that a character recognition of character image data read by a scanner or the like is performed.

In this case, the registration, storage, and retrieval of the candidate characters for recognition corresponding to the title can be performed in a similar way to those of the case that a freehand character is inputted and recognized.

These are the following three methods to discriminate a title from data in the case where character image data has been inputted:

(1) The position of a title in the character image data is set in advance. For example, in lateral lines, the title is set to the region of the left 5 cm. The characters which are located to the right of the set region are recognized as the data;

(2) The character size or font is respectively set for the title and data. The inputted characters are discriminated if they are a title or data by the difference of the size or font of the inputted characters; and (3) The inputted character image data is once displayed on the screen and the title or the data is defined by a cursor or the like on the screen.

Thus, the titles and data can be discriminated and the character recognition can be performed in a similar way to that of the freehand input characters.

The present invention can be applied to a system comprising a plurality of apparatuses or a single apparatus. Furthermore, the present invention can be applied to a case of supplying the program which executes the processings to which the present invention has directed.

As described above, according to the present embodiment, since the region of the screen where the position of a character has been inputted belongs is discriminated and the recognition candidate characters in each region can be determined according to the specified information corresponding to the region, the possibility that the character recognition corresponding to the heading is accurately performed increases.

Furthermore, effective character recognition can be performed even if the layout of the position where the inputted character is changed by the registration of the recognition candidates corresponding to each heading.

As described above, according to the present invention, even if the position where an input character is changed, the character recognition is performed on the basis of the recognition candidates corresponding to the position. Therefore, if the layout is changed, the recognition candidates do not have to be set to the changed region.

As many apparently widely different embodiments of the present invention can be made without departing from the spirit and scope thereof, it is to be understood that the invention is not limited to the specific embodiments thereof except as defined in the appended claims.

What is claimed is:

1. A computer-based character input apparatus, comprising:

input means for inputting characters by using an input unit;

region recognition means for recognizing a region on an input surface of the input unit in which the characters have been input; and character recognition means for, in a first, title-entry mode, recognizing the input characters in the region recognized by said region recognition means and for assigning a title to the region based on the recognized input characters, and for, in a second, data-entry mode, recognizing further characters input in the region to which the title has been assigned, the further characters recognized based on a limited set of expected characters related to the title.

2. An apparatus according to claim 1, further comprising:

means for setting the apparatus to operate in a plurality of modes including a plurality of freehand input modes.

3. An apparatus according to claim 1, wherein the modes include a ruled line mode whereby ruled line information can be input via said input means.

4. An apparatus according to claim 3, wherein the input unit has an input surface by means of which characters can be input, a region on the input surface is defined by the input of ruled line information in said ruled line mode.

5. An apparatus according to claim 4, wherein the modes include a data mode and a title mode.

6. An apparatus according to claim 1, further comprising:

display means having a display screen which is substantially the same size as the input surface and accommodated under the input surface, for displaying at least characters input by said input means and recognized characters.

7. An apparatus according to claim 6, wherein said character recognition means is adapted to cause said display means to display a plurality of candidate characters as a result of character recognition processing, in a case where the plurality of candidate characters are present in the limited set of expected characters, and to output a character selected among the plurality of candidate characters displayed by said display means as a recognition result.

8. An apparatus according to claim 1, further comprising:
candidate character designation means for designating the limited set of expected characters corresponding to the title.

9. A computer-based character input method for recognizing an input character and obtaining a character code corresponding to the input character, the method comprising:

an input step of inputting characters by using an input unit;

a recognition step of recognizing the characters input on the input surface; and a region recognition step of recognizing a region of the input surface in which the characters are input, wherein, in a first, title-entry mode, characters input in said input step are recognized and a title is assigned to the region based on the recognized characters, in said recognition step, and wherein, in a second, data-entry mode, further characters input in the region to which the title is assigned are recognized in said recognition step based on a limited set of expected characters related to the title.

10. A method according to claim 9, further comprising:
a ruled line input step of inputting ruled line information.

11. A method according to claim 10, wherein a region on the input surface is defined by the ruled line information.

12. A method according to claim 9, wherein a plurality of candidate characters are displayed in said character recognition step as a result of character recognition processing, and in the case where the plurality of candidate characters are present in the limited set of expected characters, a character selected among the displayed plurality of candidate characters is output as a recognition result.

13. A method according to claim 9, further comprising:
a candidate character designation step of designating the limited set of expected characters corresponding to the title.

14. A computer-readable medium storing computer-executable process steps to recognize an input character and to obtain a character code corresponding to the input character, the process steps comprising:

an input step to input characters by using an input unit;

a recognition step to recognize the characters input on the input surface; and a region recognition step to recognize a region of the input surface in which the characters are input, wherein, in a first, title-entry mode, characters input in said input step are recognized and a title is assigned to the region based on the recognized characters, in said recognition step, and wherein, in a second, data-entry mode, further characters input in the region to which the title is assigned are recognized in said recognition step based on a limited set of expected characters related to the title.

15. A computer-readable medium storing computer-executable process steps according to claim 14, the process steps further comprising:
a ruled line input step to input ruled line information.

16. A computer-readable medium storing computer-executable process steps according to claim 15, wherein a region on the input surface is defined by the ruled line information.

17. A computer-readable medium storing computer-executable process steps according to claim 14, wherein a plurality of candidate characters are displayed in said character recognition step as a result of character recognition processing, and in the case where the plurality of candidate characters are present in the limited set of expected characters, a character selected among the displayed plurality of candidate characters is output as a recognition result.

18. A computer-readable medium storing computer-executable process steps according to claim 14, the process steps further comprising:
a candidate character designation step to designate the limited set of expected characters corresponding to the title.

* * * * *

UNITED STATES PATENT AND TRADEMARK OFFICE
CERTIFICATE OF CORRECTION

PATENT NO. : 5,991,440

DATED : November 23, 1999

INVENTORS : Kazuhiro Matsubayashi, et al.  Page 1 of 2

It is certified that error appears in the above-identified patent and that said Letters Patent is hereby corrected as shown below:

COLUMN 3

Line 18, "the" should read --to the--.

COLUMN 5

Line 15, "is" should read --are all--;
   Line 19, "shown" should read --shown by--;
   Line 38, "TNONE" should read --NONE--;
   Line 64, "Y-axises" should read --Y-axes--; and
   Line 65, "y-axises" should read --Y-axes--.

COLUMN 6

Line 7, "string of coordinate" should read --string of coordinate values--; and
   Line 17, "at one on one" should read --on a one-to-one basis--.

COLUMN 7

Line 1, "consequent" should read --consequence--.

UNITED STATES PATENT AND TRADEMARK OFFICE
CERTIFICATE OF CORRECTION

PATENT NO. : 5,991,440

DATED : November 23, 1999

INVENTORS : Kazuhiro Matsubayashi, et al.

It is certified that error appears in the above-identified patent and that said Letters Patent is hereby corrected as shown below:

COLUMN 8

Line 58, "claim 1," should read --claim 2,--.

Signed and Sealed this

Fourteenth Day of November, 2000

*Attest:*

Q. TODD DICKINSON

*Attesting Officer*     *Director of Patents and Trademarks*